United States Patent
Liu et al.

(10) Patent No.: US 10,516,203 B2
(45) Date of Patent: Dec. 24, 2019

(54) ANTENNA SYSTEM AND MOBILE TERMINAL

(71) Applicant: AAC Technologies Pte. Ltd., Singapore (SG)

(72) Inventors: Jianchuan Liu, Shenzhen (CN); Yuehua Yue, Shenzhen (CN); Wei Yan, Shenzhen (CN); Li Han, Shenzhen (CN); Chi Xie, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 73 days.

(21) Appl. No.: 15/893,813

(22) Filed: Feb. 12, 2018

(65) Prior Publication Data

US 2018/0375197 A1 Dec. 27, 2018

(30) Foreign Application Priority Data

Jun. 21, 2017 (CN) .......................... 2017 1 0476833

(51) Int. Cl.
| | |
|---|---|
| *H01Q 1/06* | (2006.01) |
| *H01Q 1/24* | (2006.01) |
| *H04M 1/02* | (2006.01) |
| *H01Q 13/10* | (2006.01) |

(52) U.S. Cl.
CPC .............. *H01Q 1/243* (2013.01); *H01Q 1/06* (2013.01); *H01Q 13/10* (2013.01); *H04M 1/026* (2013.01); *H04M 1/0266* (2013.01); *H04M 1/0283* (2013.01)

(58) Field of Classification Search
CPC .......... H01Q 1/243; H01Q 1/06; H01Q 13/10; H01Q 1/38
USPC ......................................................... 343/721
See application file for complete search history.

(56) References Cited

U.S. PATENT DOCUMENTS

| | | | | |
|---|---|---|---|---|
| 9,666,951 | B2* | 5/2017 | Wang ..................... | H01Q 5/357 |
| 2012/0068905 | A1* | 3/2012 | Ayatollahi ............. | H01Q 1/243 |
| | | | | 343/841 |
| 2013/0069836 | A1* | 3/2013 | Bungo ................... | H01Q 1/243 |
| | | | | 343/724 |
| 2013/0135158 | A1* | 5/2013 | Faraone ................. | H01Q 1/243 |
| | | | | 343/702 |
| 2015/0109170 | A1* | 4/2015 | Kang ..................... | G06F 1/182 |
| | | | | 343/702 |
| 2017/0201011 | A1* | 7/2017 | Khripkov ............... | H01Q 1/243 |

* cited by examiner

*Primary Examiner* — Huedung X Mancuso
(74) *Attorney, Agent, or Firm* — IPro, PLLC; Na Xu

(57) ABSTRACT

A mobile terminal, including a display screen, a rear cover facing the display screen, a metal frame, and a circuit board; the metal frame and the circuit board are between the display screen and the rear cover and extend along outer profile of the rear cover. The antenna system includes at least one antenna unit. Each antenna unit includes a first gap in the metal frame and a second gap communicated with the first gap; the first gap extends along perimeter of the metal frame to form a strip-like hollow; the second gap extends from the middle of the first gap toward the rear cover until through the metal frame so as to divide the metal frame into a first section and a second section; the first section and the second section are electrically connected with the feeding point to form a first radiator and a second radiator, respectively.

9 Claims, 4 Drawing Sheets

US 10,516,203 B2

ANTENNA SYSTEM AND MOBILE TERMINAL

TECHNICAL FIELD

The present disclosure relates to the field of communication technology and, particularly, to an antenna system and a mobile terminal.

BACKGROUND

With the development of science and technology, on the one hand, a mobile terminal having a large-size display screen is widely used by manufacturers; on the other hand, a mobile terminal having a metal frame is very popular with consumers due to its hard appearance and excellent view quality.

When designing an antenna for a mobile terminal having a metal frame and a large-size display screen, usually a communicated gap is provided at the metal frame, so that the metal frame having the gap can be a part of the antenna, and then a signal can be transmitted to outer environment from the gap. However, the display screen is mostly made of an indium tin oxide (Indium Tin Oxide, ITO) material, a transparent conductive film, and the ITO material has high impedance, high loss and the like characteristics, which causes severe interference to the transmitting of signals from the antenna gap, thereby leading to a poor antenna performance of the mobile terminal.

Therefore, it is necessary to provide an antenna suitable for the mobile terminal having a metal frame and a large-size display screen.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

REFERENCE SIGNS

1—mobile terminal;
11—display screen;
12—rear cover;
13—metal frame;
131—gap;
131a—first gap;
131b—second gap;
132—first section;
133—second section;
14—flexible printed circuit board;
141—feeding point;
15—first antenna unit;
16—second antenna unit.

The drawings herein are incorporated into and constitute a part of the present specification, which show the embodiments of the present disclosure and illustrate the principles of the present disclosure together with the specification.

DESCRIPTION OF EMBODIMENTS

The present disclosure will be further illustrated with reference to the accompanying drawings and embodiments.

The present disclosure provides an antenna system, and the antenna system is applied in a mobile terminal to achieve a signal transmission between the mobile terminal and a base station. The antenna system provided by the present disclosure is illustrated by an example of a cellphone, however, it should be noted that, the mobile terminal is not limited to the cellphone, it can also be a handheld device such as a tablet computer, a laptop computer and the like.

Figure 1:
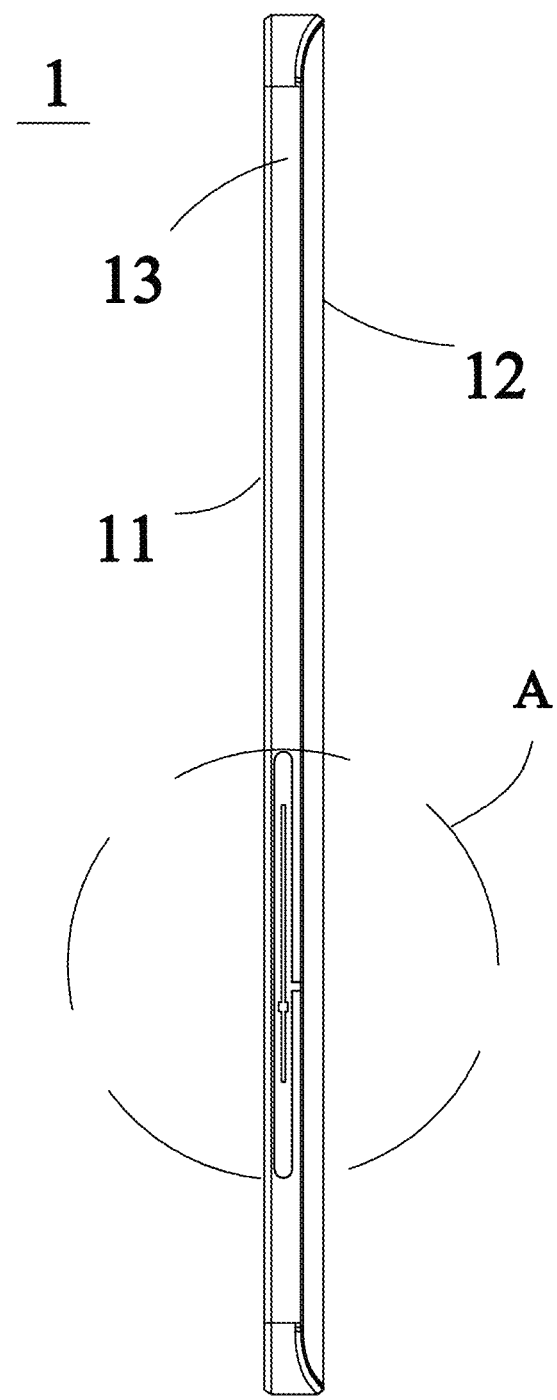
FIG. 1 is a side view of a mobile terminal in accordance with an exemplary embodiment provided by the present disclosure.

As shown in FIG. 1, the mobile terminal 1 generally includes a display screen 11 and a rear cover 12, the rear cover 12 is facing and spaced from the display screen 11, a metal frame 13 and a circuit board are provided between the display screen 11 and the rear cover 12, the metal frame 13 and a circuit board extend along an outer profile of the rear cover 12, and a feeding point is provided on the circuit board. The antenna system of the mobile terminal 1 includes the metal frame 13, and the metal frame 13 can serve as a radiator of the antenna system, for transmitting and receiving electromagnetic waves.

Figure 2:
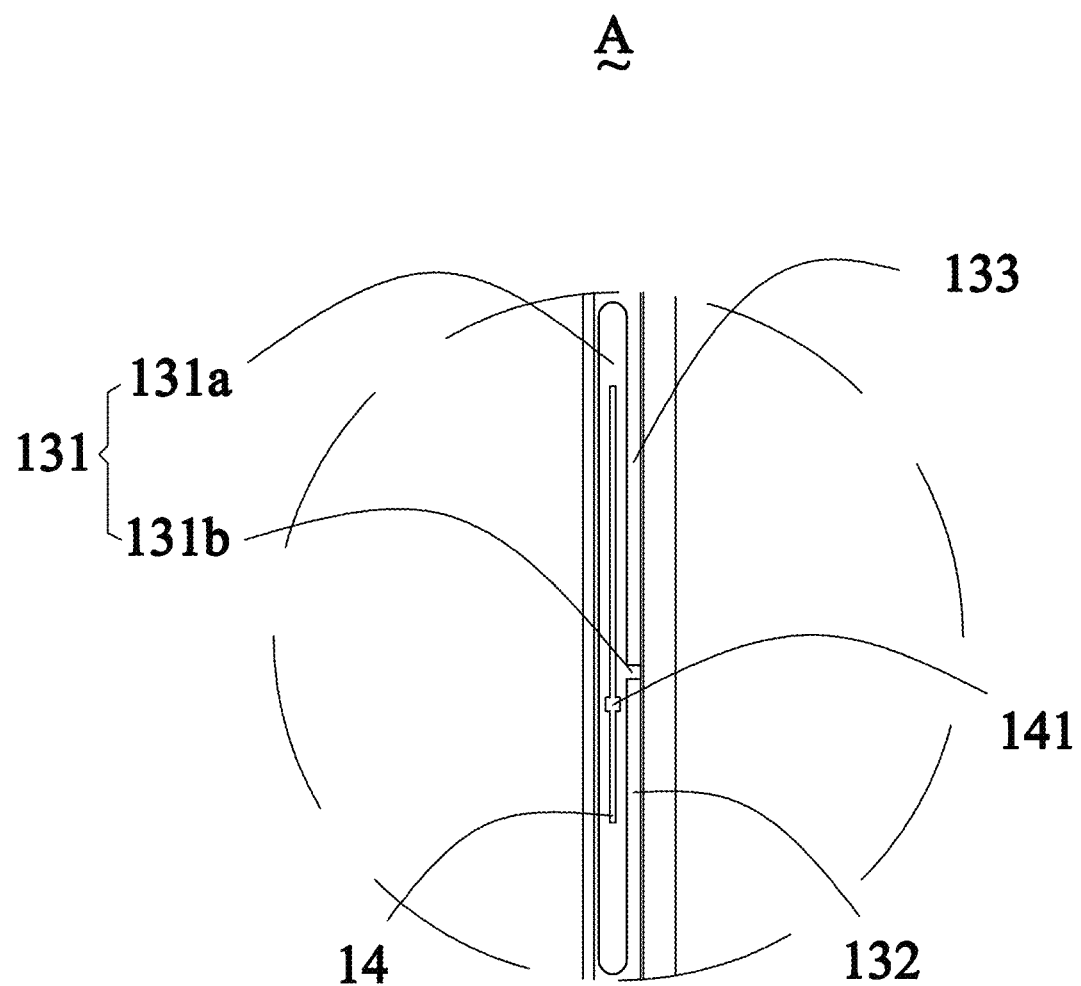
FIG. 2 is an enlarged view of a local area A of a mobile terminal in accordance with an exemplary embodiment provided by the present disclosure.

As shown in FIG. 2, the metal frame 13 is provided with a gap 131 which includes a first gap 131a and a second gap 131b, the first gap 131a is a strip-like gap extending along a perimeter of the metal frame 13, the second gap 131b is communicated with the first gap 131a, the second gap 131b extends from a middle portion of the first gap 131a toward the rear cover 12 until the second gap 131b extends through the metal frame 13 to the edge of the rear cover 12. A notch is defined in the metal frame 13 due to the formed second gap 131b, so that the metal frame at an edge of the first gap is divided into a first section 132 and a second section 133, and the first section 132 and the second section 133 are electrically connected with the feeding point to serve as a first radiator and a second radiator of the antenna system.

Accordingly, a hollow is formed in the metal frame 13 due to the formed first gap 131a, a portion of the metal frame which is close to the rear cover is divided by the second gap 131b at an edge of the hollow and then the first radiator and the second radiator are formed. A length of the first radiator and a length the second radiator are controlled by adjusting a length of the first gap 131a and a location of the second gap 131b, so that wavelengths of the electromagnetic waves transmitted and received by the first radiator and the second radiator can be changed, thereby adjusting a working frequency of the antenna system, and thus allowing the antenna system to produce a preset working frequency band. In this case, the two radiators and the second gap for leaking the signal are close to the rear cover 12 and are away from the display screen 11, so that an electromagnetic loss and a high impedance of the antenna system caused by the influence of the display screen 11 decrease, thereby improving performance of the antenna system.

In an exemplary embodiment of the present disclosure, as shown in FIG. 2, a flexible printed circuit board 14 is provided in the first gap 131a, and the feeding point 141 is provided on the flexible printed circuit board 14, the first section 132 and the second section 133 are coupled with the flexible printed circuit board 14 to feed, such a feeding manner is more flexible and can reduce connecting wires between the radiators and the flexible printed circuit board 14, thereby reducing connecting members and simplifying the connecting structure. In other embodiments, it is also possible to achieve feeding by adopting other manners.

In an exemplary embodiment of the present disclosure, in order to improve an appearance quality of the mobile terminal, a filler is filled in the gap 131 so that the metal frame 13 is formed as a closed structure. The filler can be plastic, glass, ceramic or a LED ornament, and the above-mentioned filler can guarantee insulation between the radiators and also impart an aesthetical effect.

Generally, the metal frame 13 includes a handheld portion and a non-handheld portion. Since the handheld portion is in contact with users' palms, when the gap 131 is provided at the handheld portion, a poor comfort feeling will be caused and users' satisfaction will be reduced. Thus, in an exemplary embodiment of the present disclosure, the gap 131 is provided at the non-handheld portion of the metal frame 13. Obviously, the gap can also be arranged flexibly in the non-handheld portion when space is limited.

Figure 3:
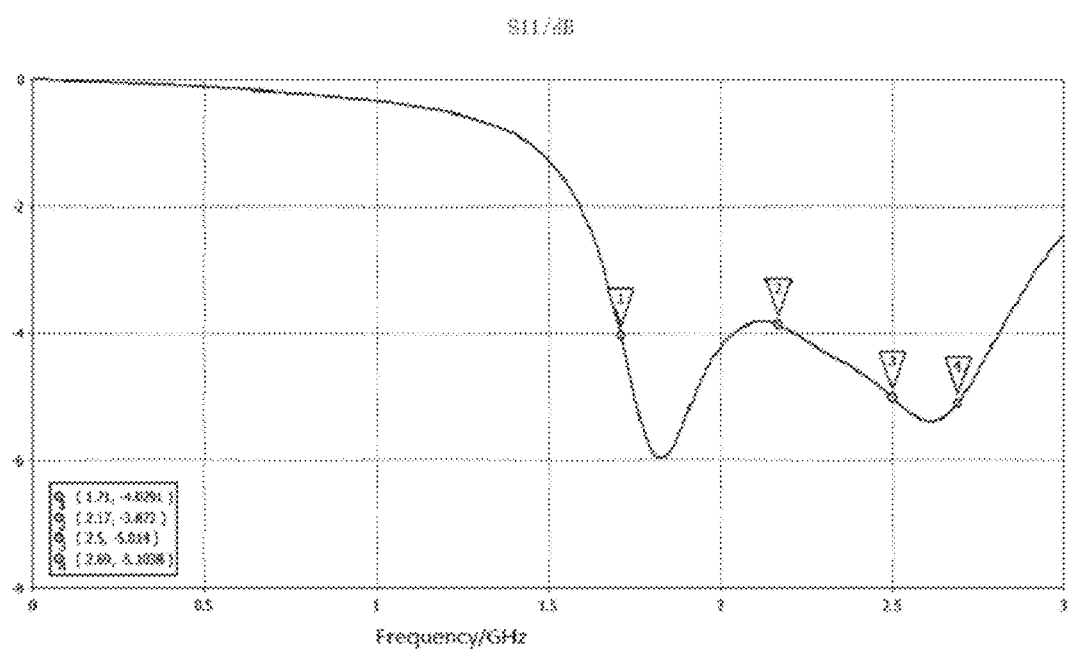
FIG. 3 is a graph showing a reflection coefficient of an antenna unit in accordance with an exemplary embodiment provided by the present disclosure.
Figure 4:
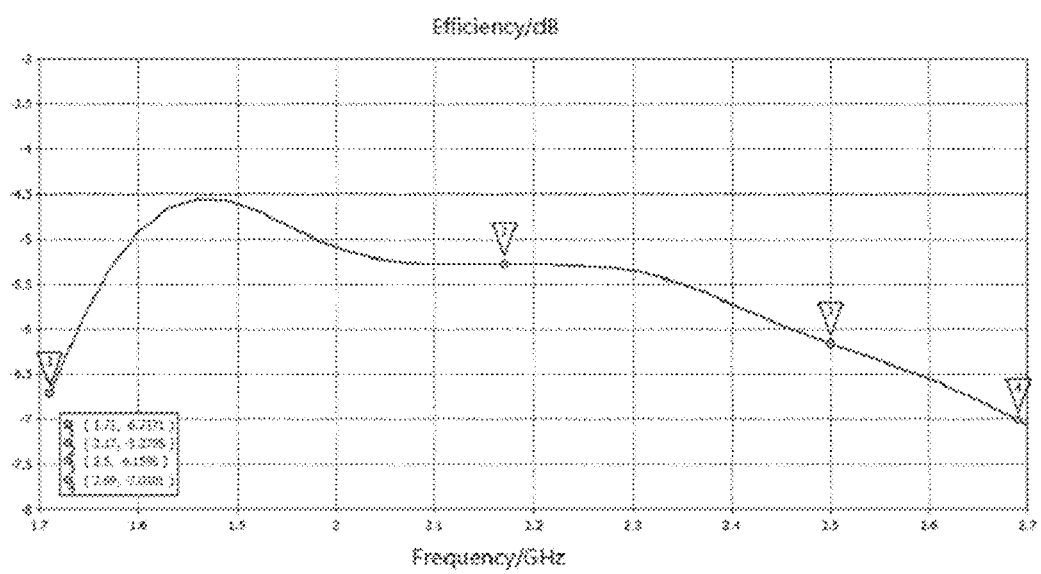
FIG. 4 is a graph showing an efficiency of an antenna unit in accordance with an exemplary embodiment provided by the present disclosure.

In an exemplary embodiment of the present disclosure, as shown in FIGS. 1-2, the second gap 131b is perpendicularly connected with the first gap 131a, a length of the first gap 131a is in a range of 45 mm-51 mm, and a width of the first gap 131a is in a range of 1 mm-2.5 mm, a length of the first section 132 is in a range of 18 mm-22 mm, and a length of the second section 133 is in a range of 27 mm-29 mm, a width of an interval (i.e., the second gap 131b) between the first section 132 and the second section 133 is in a range of 0.6 mm-1.2 mm; Optionally, the length of the first gap 131a is 48 mm, and the width of the first gap 131a is 2 mm, the length of the first section 132 is 21 mm, and the length of the second section 133 is 27 mm, the width of the interval (i.e., the second gap 131b) between the first section 132 and the second section 133 is 1 mm. FIG. 3 is a graph showing a reflection coefficient of the antenna unit, FIG. 4 is a graph showing an efficiency of the antenna unit. It can be seen that, the antenna unit can cover a working frequency band of 1710 MHz-2690 MHz, which is relatively wide and good in performance.

It should be noted that, the size of each portion of the above-described gaps is merely set as an exemplary embodiment, and the size of the gaps may vary according to the working frequency band covered by the antenna system. An extending direction of the first gap 131a and an extending direction of second gap 131b are not limited to being perpendicular to each other, in some other embodiments, it is also possible that an acute or obtuse angle is formed between the two.

In addition, each radiator of the antenna system further needs to be directly connected with or coupled with a grounding point. A portion of the metal frame may serve as a system ground, or it can be connected with a ground layer of the circuit board of the mobile terminal so as to achieve grounding.

In the mobile terminal, in order to achieve a multi-antenna technology of the antenna system, for example, the antenna system needs to include a main antenna, a diversity antenna, a GPS antenna, a WIFI antenna, a BT antenna and so on, the metal frame 13 can be provided with a plurality of gaps, and each gap is arranged along the perimeter of the metal frame 13, thus a plurality of antenna units are formed at the metal frame 13, each antenna unit achieves implementing requirements of different frequency bands by controlling a length of the radiator, thereby obtaining a multi-antenna antenna system with improved performance.

Figure 5:
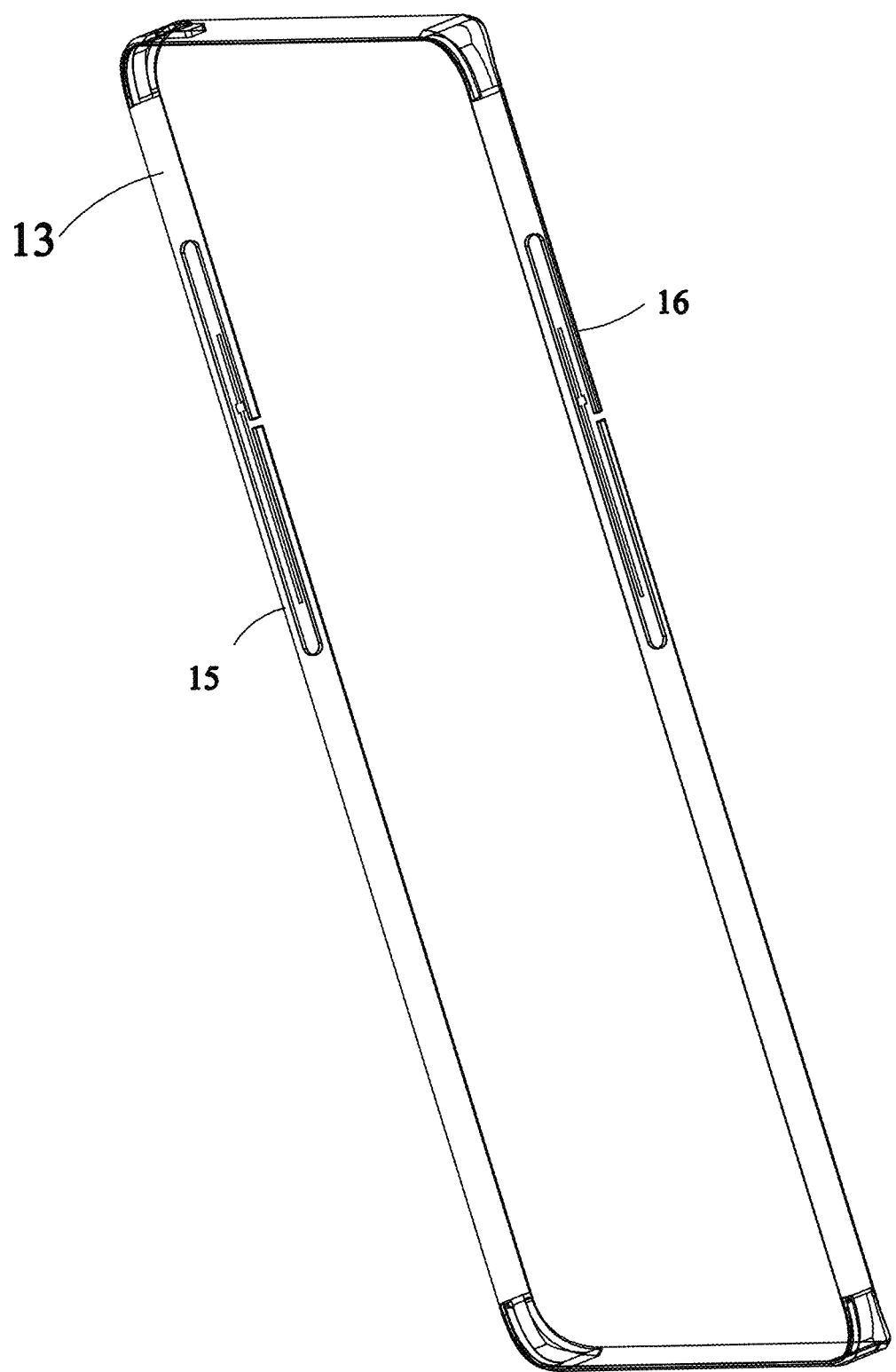
FIG. 5 is a schematic view of an antenna system in accordance with another exemplary embodiment provided by the present disclosure.

In another exemplary embodiment of the present disclosure, as shown in FIG. 5, the metal frame 13 is formed with a first antenna unit 15 and a second antenna unit 16, and thus two long term evolution (Long Term Evolution, LTE) antenna units are formed. The two LTE antenna units, the main antenna and the diversity antenna together form a LTE 4×4 MIMO antenna system.

The present disclosure further provides a mobile terminal, and the mobile terminal includes the antenna system as described in any one of the above embodiments.

The above description only shows optional embodiments of the present disclosure and is not intended to limit the present disclosure. Various replacements and modifications may be made by those skilled in the art. Any modifications, equivalent replacements, improvements and the like made within the spirit and principles of the present disclosure should be included in the protection scope of the present disclosure.

What is claimed is:

1. An antenna system, which is applied in a mobile terminal, wherein the mobile terminal comprises a display screen, a rear cover facing the display screen, a metal frame, and a circuit board provided with a feeding point, the metal frame and the circuit board are located between the display screen and the rear cover and respectively extend along an outer profile of the rear cover; the antenna system comprises:

at least one antenna unit, each antenna unit comprising a first gap provided at the metal frame and a second gap communicated with the first gap;

wherein the first gap extends along a perimeter of the metal frame to form a strip-like hollow in the metal frame; the second gap extends from a middle portion of the first gap toward the rear cover until penetrating through the metal frame, so that a portion of the metal frame at an edge of the first gap is divided into a first section and a second section; and the first section and the second section are electrically connected with the feeding point to form a first radiator and a second radiator of the antenna system, respectively;

the circuit board is placed in the first gap; and the first section and the second section are coupled with the circuit board to achieve feeding.

2. The antenna system as described in claim 1, wherein the circuit board is a flexible printed circuit board.

3. The antenna system as described in claim 1, wherein the antenna system further comprises a filler, and the filler is filled in the first gap and the second gap; the filler is selected from a group consisting of plastics, glasses, ceramics or light emitting diode (LED) ornaments.

4. The antenna system as described in claim 1, wherein the metal frame is divided into a handheld portion and a non-handheld portion, and the antenna unit is arranged at the non-handheld portion of the metal frame.

5. The antenna system as described in claim 1, wherein a plurality of antenna units are provided, and the plurality of antenna units are arranged along the perimeter of the metal frame.

6. The antenna system as described in claim 1, wherein the second gap is perpendicularly connected with the first gap.

7. The antenna system as described in claim 1, wherein a length of the first gap is in a range of 45 mm-51 mm, and a width of the first gap is in a range of 1 mm-2.5 mm; a length of the first section is in a range of 18 mm-22 mm, and a length of the second section is in a range of 27 mm-29 mm, a width of the second gap 131*b* between the first section and the second section is 0.6 mm-1.2 mm.

8. The antenna system as described in claim 1, wherein the antenna system covers a working frequency band of 1710 MHz-2690 MHz.

9. A mobile terminal, comprising the antenna system as described in claim 1.

\* \* \* \* \*